(12) United States Patent
Vasbø et al.

(10) Patent No.: US 12,050,293 B2
(45) Date of Patent: Jul. 30, 2024

(54) MEDETOMIDINE COMPOSITIONS HAVING IMPROVED ANTI-FOULING CHARACTERISTICS

(71) Applicant: PGS Geophysical AS, Oslo (NO)

(72) Inventors: Christian Vasbø, Oslo (NO); Rune Tønnessen, Oslo (NO)

(73) Assignee: PGS Geophysical AS, Oslo (NO)

( * ) Notice: Subject to any disclaimer, the term of this patent is extended or adjusted under 35 U.S.C. 154(b) by 582 days.

(21) Appl. No.: 16/713,289

(22) Filed: Dec. 13, 2019

(65) Prior Publication Data

US 2020/0200928 A1 Jun. 25, 2020

Related U.S. Application Data

(60) Provisional application No. 62/782,169, filed on Dec. 19, 2018.

(51) Int. Cl.
| | | |
|---|---|---|
| *G01V 1/00* | (2024.01) | |
| *B05D 1/02* | (2006.01) | |
| *B05D 1/18* | (2006.01) | |
| *B05D 1/28* | (2006.01) | |
| *C09D 5/16* | (2006.01) | |
| *C09D 7/65* | (2018.01) | |
| *C09D 175/04* | (2006.01) | |
| *G01V 1/20* | (2006.01) | |
| *G01V 1/38* | (2006.01) | |
| *C08L 91/06* | (2006.01) | |

(52) U.S. Cl.
CPC .............. *G01V 1/201* (2013.01); *B05D 1/02* (2013.01); *B05D 1/18* (2013.01); *B05D 1/28* (2013.01); *C09D 5/1625* (2013.01); *C09D 7/65* (2018.01); *C09D 175/04* (2013.01); *G01V 1/38* (2013.01); *C08L 91/06* (2013.01)

(58) Field of Classification Search
None
See application file for complete search history.

(56) References Cited

U.S. PATENT DOCUMENTS

| | | | |
|---|---|---|---|
| 6,762,227 B1 | 7/2004 | Elwing et al. | |
| 7,531,581 B2 | 5/2009 | Nyden et al. | |
| 9,116,253 B2 | 8/2015 | Stenzel et al. | |
| 9,534,121 B2 * | 1/2017 | Thorlaksen | C09D 5/1675 |

(Continued)

FOREIGN PATENT DOCUMENTS

| | | |
|---|---|---|
| CN | 102753532 | 5/2015 |
| DE | 202018001813 | 5/2018 |

(Continued)

OTHER PUBLICATIONS

EP-767223-A2—English translation (Year: 1996).*

(Continued)

*Primary Examiner* — Stefanie J Cohen

(57) ABSTRACT

Embodiments generally relates to marine geophysical surveying. More particularly, the present disclosure relates to treatment of geophysical equipment with medetomidine compounds for reduction of marine growth. A method may comprise combining at least a medetomidine compound and a wax to form a mixture; and forming an outer layer disposed on a marine geophysical equipment, wherein the outer layer comprises the mixture of the medetomidine compound and the wax.

12 Claims, 3 Drawing Sheets

(56) References Cited

U.S. PATENT DOCUMENTS

| | | | |
|---|---|---|---|
| 10,053,420 B2 | 8/2018 | Eklund et al. | |
| 2005/0188908 A1* | 9/2005 | Hillesund | G01V 1/38 |
| | | | 114/344 |
| 2006/0189686 A1 | 8/2006 | Martensson | |
| 2012/0176860 A1* | 7/2012 | Stenzel | A01N 59/16 |
| | | | 367/20 |
| 2012/0196496 A1* | 8/2012 | Granovsky | D03D 15/43 |
| | | | 139/420 R |
| 2012/0321809 A1* | 12/2012 | Hartshorne | C09D 5/1662 |
| | | | 525/123 |
| 2013/0039153 A1* | 2/2013 | Hartshorne | B29C 48/022 |
| | | | 427/299 |
| 2013/0236696 A1* | 9/2013 | Poole | C23C 24/04 |
| | | | 427/446 |
| 2014/0033962 A1* | 2/2014 | Macquin | G01V 13/00 |
| | | | 114/222 |
| 2014/0242261 A1 | 8/2014 | Macquin et al. | |
| 2014/0242403 A1 | 8/2014 | Olsen et al. | |
| 2014/0247690 A1* | 9/2014 | Macquin | G01V 1/3843 |
| | | | 367/15 |
| 2014/0334258 A1* | 11/2014 | Karlsen | G01V 1/3826 |
| | | | 73/431 |
| 2015/0073069 A1* | 3/2015 | De Gans | C09D 7/45 |
| | | | 523/435 |
| 2015/0226869 A1 | 8/2015 | Harrick | |
| 2015/0285949 A1 | 10/2015 | Macquin et al. | |
| 2016/0083592 A1 | 3/2016 | Olsen et al. | |
| 2016/0368892 A1* | 12/2016 | Bassler | C07D 213/75 |
| 2017/0130064 A1 | 5/2017 | Sorensen et al. | |
| 2017/0235017 A1 | 8/2017 | Vasbø et al. | |
| 2017/0298234 A1 | 10/2017 | Haeffner et al. | |
| 2018/0321032 A1 | 11/2018 | Vasbø et al. | |

FOREIGN PATENT DOCUMENTS

| | | | | |
|---|---|---|---|---|
| EP | 767223 A2 * | 4/1997 | | C09D 5/1656 |
| EP | 1910477 | 10/2011 | | |
| EP | 2726559 | 5/2014 | | |
| EP | 2734508 | 5/2014 | | |
| EP | 2516559 | 1/2015 | | |
| EP | 1856215 | 5/2016 | | |
| EP | 2393886 | 5/2016 | | |
| EP | 2976394 | 12/2016 | | |
| EP | 2551309 | 5/2017 | | |
| EP | 3399351 | 11/2018 | | |
| JP | 2018080275 | 5/2018 | | |
| JP | 6360909 | 7/2018 | | |
| KR | 101817486 | 1/2018 | | |
| KR | 101817487 | 1/2018 | | |
| KR | 101831536 | 2/2018 | | |
| TW | 200923035 | 6/2009 | | |
| TW | 200923036 | 6/2009 | | |
| WO | 2011070069 | 6/2011 | | |
| WO | WO-2013072769 A1 * | 5/2013 | | C09D 143/04 |
| WO | 2015011178 | 1/2015 | | |
| WO | WO-2015011177 A1 * | 1/2015 | | A01N 43/50 |
| WO | WO-2015011178 A1 * | 1/2015 | | C09D 5/00 |
| WO | 2016177884 | 11/2016 | | |
| WO | 2018003136 | 1/2018 | | |
| WO | 2018003137 | 1/2018 | | |
| WO | 2018003135 | 4/2018 | | |
| WO | 2018074801 | 4/2018 | | |
| WO | 2018087160 | 5/2018 | | |
| WO | 2018087846 | 5/2018 | | |
| WO | 2018182499 | 10/2018 | | |

OTHER PUBLICATIONS

Technology Article, Aug. 19, 2016.
Extended European Search Report for Application No. 19217617.0 dated May 18, 2020.
EP Examination Report for Patent Application No. 19217617.0-1001 dated Aug. 29, 2022.

* cited by examiner

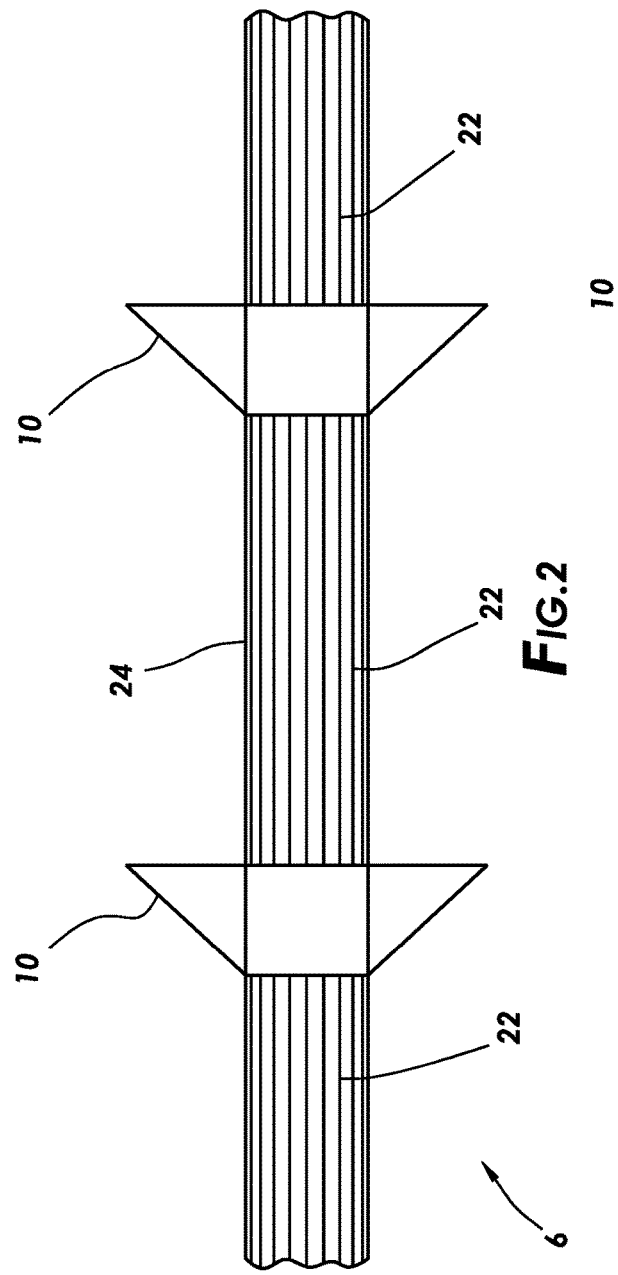
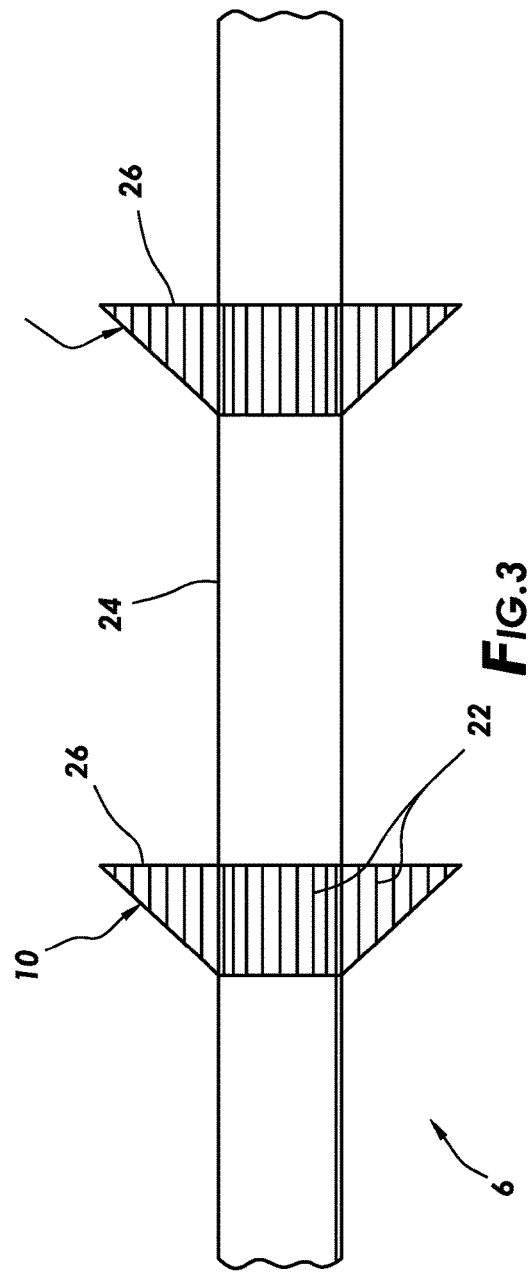

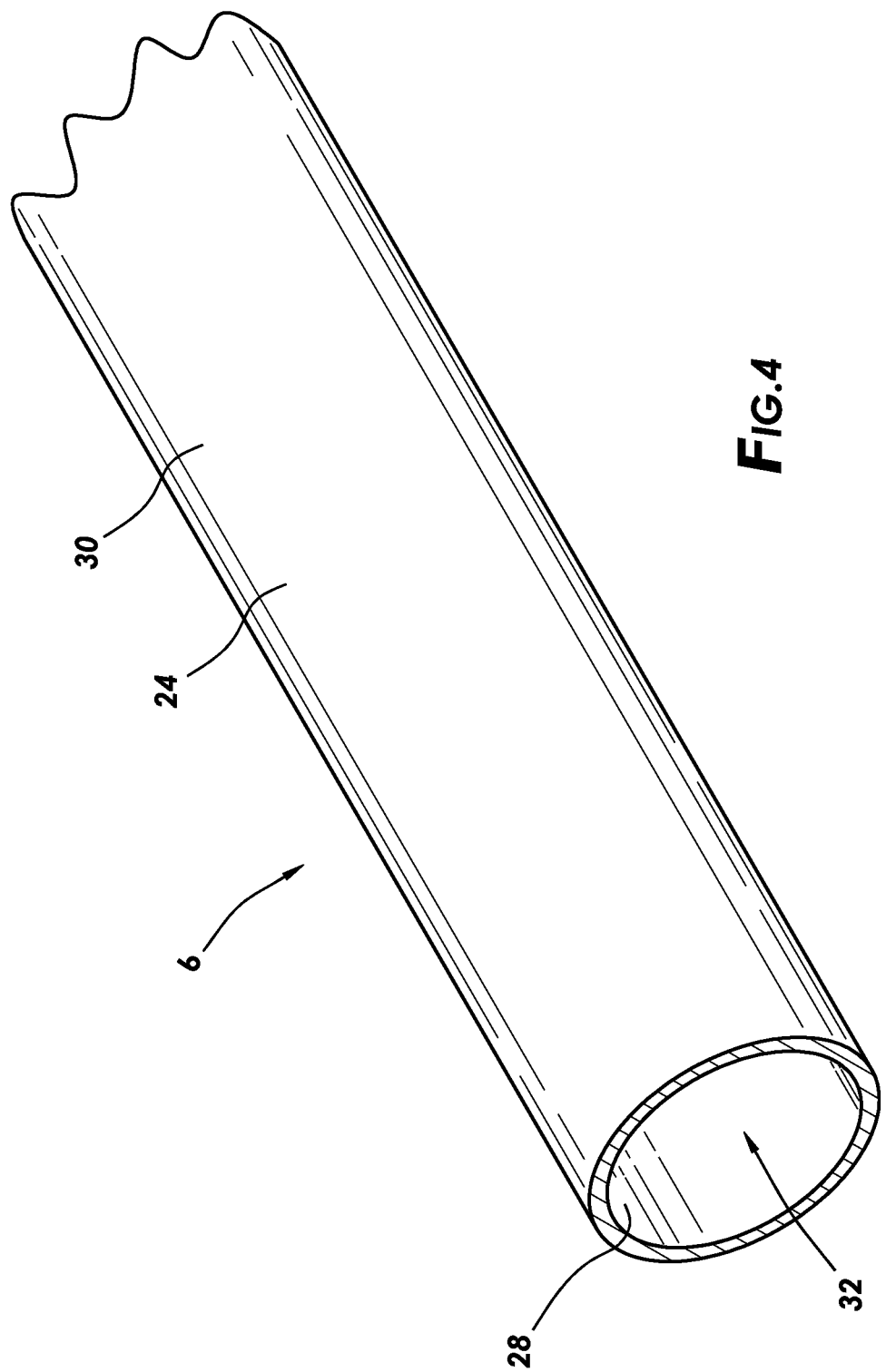

MEDETOMIDINE COMPOSITIONS HAVING IMPROVED ANTI-FOULING CHARACTERISTICS

CROSS-REFERENCE TO RELATED APPLICATIONS

The present application claims priority to U.S. Provisional Application No. 62/782,169, filed on Dec. 19, 2018, the entire disclosure of which is incorporated herein by reference.

BACKGROUND

Techniques for marine geophysical surveying include seismic surveying and electromagnetic surveying, in which geophysical data may be collected from below the Earth's surface. Geophysical surveying has applications in mineral and energy exploration and production to help identify locations of hydrocarbon-bearing formations. Certain types of marine geophysical surveying, such as seismic or electromagnetic surveying, may include towing an energy source at a selected depth—typically above the seafloor—in a body of water. One or more streamers also may be towed in the water at selected depths—typically above the seafloor—by the same or a different vessel. The streamers are typically cables that include a plurality of sensors disposed thereon at spaced apart locations along the length of the cable. Some geophysical surveys locate sensors on ocean bottom cables or nodes in addition to, or instead of, streamers. The energy sources may be configured to generate a signal that is related to a parameter being measured by the sensor. At selected times, the energy source may be actuated to generate, for example, seismic or electromagnetic energy that travels downwardly into the subsurface rock. Energy that interacts with interfaces, generally at the boundaries between layers of rock formations, may be returned toward the surface and detected by the sensors on the streamers. The detected energy may be used to infer certain properties of the subsurface rock, such as structure, mineral composition, and fluid content, thereby providing information useful in the recovery of hydrocarbons.

Unfortunately, marine organisms may adhere to, and then grow on, nearly everything that is placed in water for extended periods of time, including marine geophysical sensor cables, such as towed streamers or ocean-bottom cables. For convenience, any such marine geophysical sensor cable will be referred to herein as a "streamer." Marine growth can also occur on other geophysical equipment, such as position control devices, covers, floats, and inserts, among other streamer accessories. Marine growth (also known as biofouling) often refers to barnacle growth but is intended to also include the growth of mussels, oysters, algae, bacteria, tubeworms, slime, and other marine organisms. This marine growth is particularly problematic with streamers as the marine growth can increase drag resistance of the streamer, leading to increased fuel costs and/or reduced production speed. An additional problem with marine growth includes reduced data quality due to increased noise.

To address marine growth, antifouling paints or coatings may be applied to the streamer. These antifouling paints may include biocides, heavy-metal compounds, or other materials that can inhibit marine growth. Marine growth can also be addressed by cleaning of the geophysical equipment at regular intervals, for example, to reduce noise in the collected data. However, the requisite cleaning to reduce marine growth can decrease survey time and increase time out of water, thus potentially increasing survey costs.

BRIEF DESCRIPTION OF THE DRAWINGS

These drawings illustrate certain aspects of some of the embodiments of the present invention and should not be used to limit or define the invention.

FIG. 2 illustrates a particular embodiment of a streamer treated with a medetomidine compound in an outer layer on the streamer skin for reduction of marine growth.

FIG. 3 illustrates a particular embodiment of geophysical survey equipment treated with a medetomidine compound in an outer layer on geophysical equipment for reduction of marine growth.

FIG. 4 illustrate a particular embodiment of a streamer skin that has been treated with a medetomidine compound by integration of the medetomidine compound into the streamer skin during manufacture.

DETAILED DESCRIPTION

Figure 1:
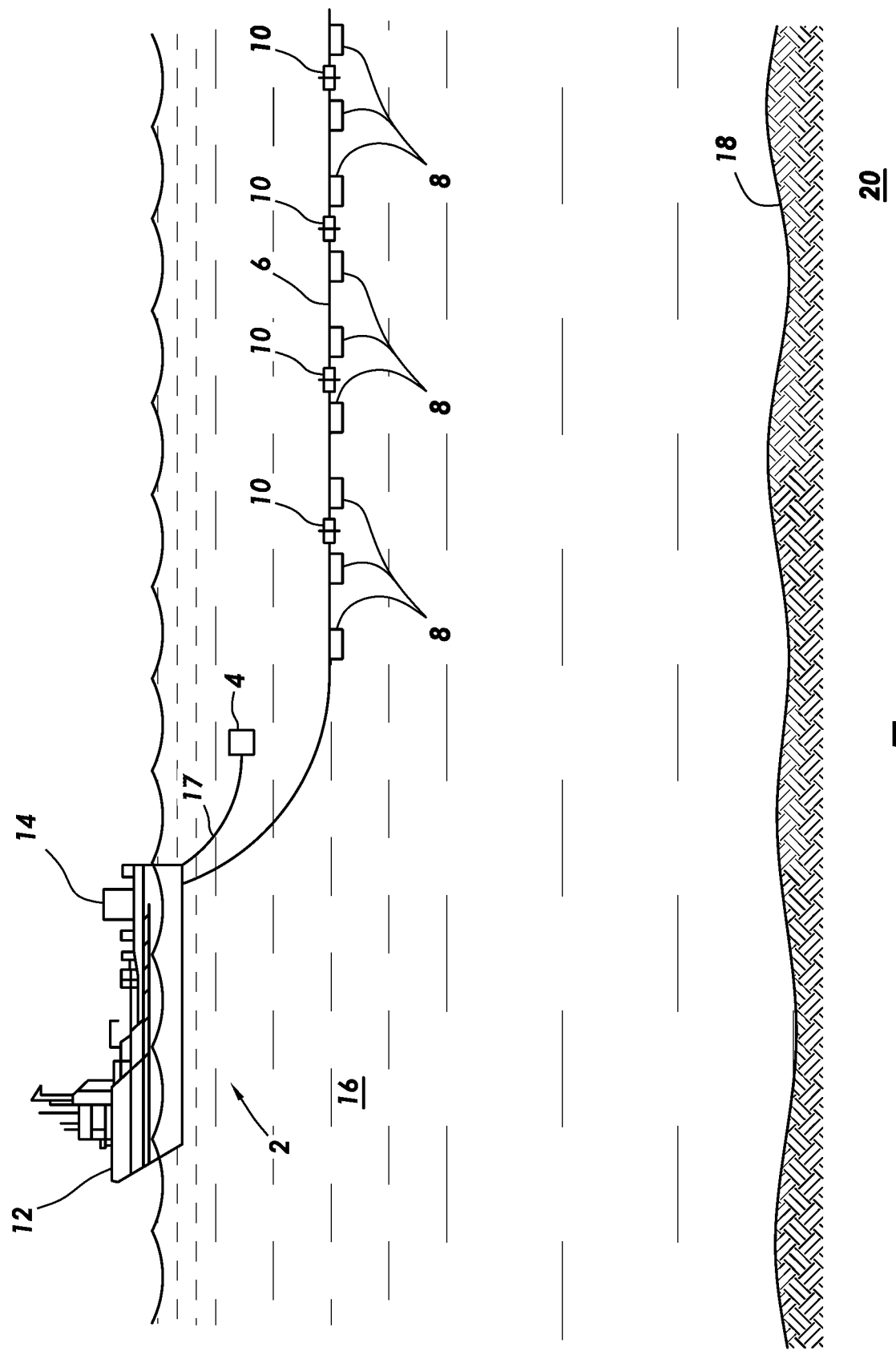
FIG. 1 illustrates a particular embodiment of a marine seismic survey system employing geophysical survey equipment that can be treated with medetomidine for reduction of marine growth.

It is to be understood that the present disclosure is not limited to particular devices or methods, which may, of course, vary. It is also to be understood that the terminology used herein is for the purpose of describing particular embodiments only and is not intended to be limiting. All numbers and ranges disclosed herein may vary by some amount. Whenever a numerical range with a lower limit and an upper limit is disclosed, any number and any included range falling within the range are specifically disclosed. Although individual embodiments are discussed herein, the invention covers all combinations of all those embodiments. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected. If there is any conflict in the usages of a word or term in this specification and one or more patent or other documents that may be incorporated herein by reference, the definitions that are consistent with this specification should be adopted for the purposes of understanding this invention.

The present disclosure generally relates to marine geophysical surveying. More particularly, the present disclosure relates to treatment of geophysical equipment with medetomidine compounds for reduction of marine growth.

As used herein, the term "medetomidine compound" refers to medetomidine, enantiomers of medetomidine, or salts thereof. Medetomidine is a compound that is also referred to as ±4-[(1-(2,3-dimethylphenyl)ethyl]-1H-imidazole. Medetomidine can have the following chemical structure:

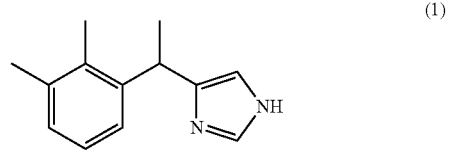

(1)

Enantiomers of medetomidine may also be used. Suitable enantiomers of medetomidine may include, but are not limited to, levomedetomidine and dexmedetomidine, which may be the levo- and dextro-rotary optical isomers of medetomidine, respectively. Suitable salts of medetomidine and its enantiomers may include, but are not limited to, addition salts and base addition salts.

Medetomidine is commonly used as a drug in humans as well as for veterinary purposes. For example, medetomidine can be used as both a surgical anesthetic and analgesic. However, in addition to medicinal purposes, medetomidine can also prevent marine growth. For example, medetomidine can be effective in the prevention of biofouling, such as barnacle growth. Accordingly, embodiments use medetomidine compounds to prevent (or reduce) marine growth in geophysical surveying.

Particular embodiments may include treatment of geophysical equipment with a medetomidine compound. Advantageously, treatment of the geophysical equipment with the medetomidine compound can provide geophysical equipment that is more resistant to marine growth, thus limiting problems with biofouling. Thus, with the medetomidine treatment geophysical surveys may be completed more efficiently and effectively, as problems associated with biofouling have been reduced, limiting downtime needed for cleaning, as well reducing noise problems due to biofouling.

Suitable medetomidine treatment may include any suitable technique for applying the medetomidine compound to the geophysical equipment. For example, the medetomidine compound may be integrated into the geophysical equipment and/or applied as an outer layer (e.g., a coating) on the geophysical equipment. Suitable coatings may include, but are not limited to, polymeric coatings and wax coatings. Integration of the medetomidine compound into the geophysical equipment may include, but are not limited to, combining the medetomidine with a base material for the geophysical equipment to form a mixture and then forming the geophysical equipment from the mixture. The medetomidine compound may be used in the treatment of any of a variety of geophysical equipment, for example, where biofouling may be problematic. In some embodiments, the medetomidine compound may be used in the treatment of streamers. For example, the medetomidine compound may be integrated into a streamer skin and/or included in a coating (or outer layer) on the streamer skin. In addition, the medetomidine compound may also be used in the treatment of other geophysical equipment. A wide variety of geophysical equipment can be treated with the medetomidine compounds, including, but not limited to, position control devices (e.g., steering birds) or particular portions thereof, streamer adapters for acoustic positioning, modules, weight blocks, dummy weights, connectors, connector covers, floats, inserts, and other streamer accessories (e.g., retrievers, pingers, etc.), among others. Position control devices may be any number of devices suitable for positioning a streamer in the horizontal plane, the vertical plane, and/or both the horizontal and vertical planes, including "birds" having variable-incidence wings. In some embodiments, the wings of a position control device may be treated with the medetomidine compound. For example, the medetomidine compound may be integrated into the wings and/or included in a coating on the wings. Floats may include a buoy or other suitable flotation device from which other marine geophysical equipment (e.g., sound sources) may be suspended. Floats may or may not have the capability to control and/or adjust the depth of the suspended device.

In some embodiments, a medetomidine treatment may include integration of the medetomidine compound into geophysical equipment. Any suitable technique may be used for integration of the medetomidine compound into the geophysical equipment. By way of example, the medetomidine compound may be combined with a base material for the geophysical equipment to form a mixture. As used herein, the base material refers to one or more materials that form a major amount of the geophysical equipment in which the medetomidine compound is integrated. By way of example, the medetomidine compound may be mixed with the base material to distribute the medetomidine compound in the base material. The mixture may then be formed into the geophysical equipment. In some embodiments, the mixture may be molded into a desired form. For example, the mixture may be placed into a mold and allowed to set into the desired form. By way of example, the mixture may be molded into a wing or other suitable shape for the geophysical equipment. In some embodiments, the mixture may be injection molded. In some embodiments, the mixture may be extruded into a desired form. For example, the mixture may be extruded to form a streamer skin or other suitable shape for the geophysical equipment.

In forming of the geophysical equipment, the medetomidine compound may be combined with any suitable base material. Suitable base materials for the geophysical equipment, may include, but are not limited to, thermoplastic polymers, such as polyurethane, polypropylene, polyamides, and combinations thereof. The medetomidine compound may also be combined with the base material in any suitable amount. In some embodiments, the medetomidine compound may be included in a mixture with the base material in an amount of about 0.01% to about 1% based on a total weight of the mixture. For example, the medetomidine compound may be included in the base mixture in an amount of about 0.05% to about 0.5% or about 0.05% to about 0.1% or about 0.1% to about 0.5% based on a total weight of the mixture. In particular embodiments, the medetomidine compound may be included in the mixture in an amount of about 0.01%, about 0.05%, about 0.1%, about 0.2%, about 0.5%, about 0.7%, or about 1.0% based on a total weight of the mixture. One of ordinary skill in the art with the benefit of this disclosure should be able determine an appropriate base material and amount of medetomidine compound to use for a particular application.

In some embodiments, a medetomidine treatment may include an outer layer of the medetomidine compound on the geophysical equipment. The outer layer may be applied by a coating technique or other suitable process. For example, the medetomidine may be included in a mixture with a carrier material that may be used in an outer layer of the geophysical equipment. The carrier material, for example, may be the same material used in forming the geophysical equipment or may be a different material than used in forming the geophysical equipment. In some embodiments, the outer layer may be applied to the geophysical equipment as a coating. Any suitable coating process may be used in applying the coating mixture of the carrier material and the medetomidine compound to the geophysical equipment. Suitable coating processes may include, but are not limited to, spray coating, dip coating, roller coating, and brush coating, among others. In some embodiments, the outer layer may be a coating on a wing, streamer skin, or other suitable geophysical equipment. In addition to coating, other suitable techniques may also be used for application of the outer layer. For example, the mixture may be co-extruded with the base material to form geophysical equipment comprising the carrier material and having an outer layer of the carrier material and the medetomidine compound.

In forming of the outer layer of the geophysical equipment, the medetomidine compound may be combined in a mixture with any suitable carrier material. Suitable carrier materials for the medetomidine, may include, but are not limited to, thermoplastic polymers, such as polyurethane, polypropylene, polyamides, waxes, and combinations thereof. In some embodiments, the carrier material may be a wax composition that includes wax and one or more additional materials, such as an oleaginous liquid and an alcohol. By way of example, the wax composition may comprise lanolin wax and lanolin alcohol. Non-limiting examples of suitable oleaginous liquids may include organic oils (e.g., vegetable oils) or synthetic oils. Suitable waxes may include, but are not limited to, animal waxes, plant waxes, petroleum waxes, polyethylene waxes, and combinations thereof. Animal waxes may include waxes synthesized by animals (including insects) as well as chemically modified versions thereof. Plant waxes may include waxes synthesized by plants as well as chemically modified versions thereof. Petroleum waxes may include waxes derived from petroleum. Polyethylene waxes may include waxes derived from polyethylene. Specific examples of suitable waxes may include, but are not limited to, cocoa butter, illipe butter, lanolin, cetyl palmitate, bayberry wax, lanolin alcohol, paraffin wax, silicone wax, and sumax wax, among others. The wax composition may be selected, for example, to have a melting point based on a predetermined water temperature in which the wax composition will be used. For example, the geophysical equipment on the particular components and concentrations thereof in the wax composition may be selected to provide a melting pointed based on the predetermined water temperature. By selection of an appropriate melting point the wax composition may provide better adherence to the geophysical equipment when deployed in the water. In some embodiments, the wax composition may have a melting point within about 2° C., about 5° C., or about 10° C. of a predetermined water temperature. One of ordinary skill in the art with the benefit of this disclosure should be able determine an appropriate carrier material to use for a particular application.

The medetomidine compound may also be combined in the mixture with the carrier material in any suitable amount. In some embodiments, the medetomidine compound may be included in the mixture with the carrier material in an amount of about 0.01% to about 1% based on a total weight of the mixture. For example, the medetomidine compound may be included in the mixture in an amount of about 0.05% to about 0.5% or about 0.05% to about 0.1% or about 0.1% to about 0.5% based on a total weight of the mixture. In particular embodiments, the medetomidine compound may be included in the mixture in an amount of about 0.01%, about 0.05%, about 0.1%, about 0.2%, about 0.5%, about 0.7%, or about 1.0% based on a total weight of the mixture. One of ordinary skill in the art with the benefit of this disclosure should be able determine an appropriate amount of medetomidine compound to use for a particular application.

Referring now to FIG. 1, a marine geophysical survey system 2 that employs geophysical equipment treated with a medetomidine compound is illustrated in accordance with particular embodiments. For example, the marine geophysical survey system 2 includes an energy source 4, a streamer 6, geophysical sensors 8, and position control devices 10. One or more of the energy source 4, streamer 6, geophysical sensors 8, and/or position control devices 10 may be treated with the medetomidine compound for reduction of marine growth. While not shown, the marine geophysical survey system 2 may also include additional geophysical equipment, such as floats and inserts, among others, that can be treated with the medetomidine compound.

In the illustrated embodiment, the marine geophysical survey system 2 may further include a survey vessel 12. The survey vessel 12 may include thereon equipment, shown generally at 14 and collectively referred to herein as a "recording system." The recording system 14 may include devices (none shown separately) for detecting and making a time indexed record of signals generated by each of geophysical sensors 8 (explained further below) and for actuating an energy source 4 at selected times. The recording system 14 may also include devices (none shown separately) for determining the geodetic position of the survey vessel 12 and the various geophysical sensors 8.

In some embodiments, the survey vessel 12 (or a different vessel) may tow the energy source 4 in the body of water 16. A source cable 17 may couple the energy source 4 to the survey vessel 12. The energy source 4 may be towed in the body of water 16 at any suitable depth, for example, a depth ranging from 0 meters to about 300 meters. While only a single energy source 4 is shown in FIG. 1, it is contemplated that embodiments may include more than one energy source 4. The energy source 4 may be any selectively actuatable source suitable for subsurface geophysical surveying, including without limitation seismic air guns, water guns, vibrators or arrays of such devices, or one or more electromagnetic field transmitters.

In some embodiments, the survey vessel 12 or another vessel may tow one or more streamers 6 on which the geophysical sensors 8 may be disposed. As illustrated, the energy source 4 and streamer 6 may be towed above the water bottom 18. The streamer 6 may include a towed marine seismic streamer, a towed marine electromagnetic streamer, or a combination thereof. While not shown, some marine seismic surveys locate geophysical sensors 8 on ocean bottom cables or nodes in addition to, or instead of, a streamer 6. In some embodiments, more than one streamer 6 may be towed by the survey vessel 12 or another vessel, and the streamers 6 may be spaced apart laterally, vertically, or both laterally and vertically.

As illustrated, the geophysical sensors 8 may be disposed at spaced apart locations on the streamer 6. The geophysical sensors 8 may be, without limitation, seismic sensors such as geophones, hydrophones, or accelerometers, or electromagnetic field sensors, such as electrodes or magnetometers. The geophysical sensors 8 may generate response signals, such as electrical or optical signals, in response to detecting energy emitted from the energy source 4 after the energy has interacted with formations 20 below the water bottom 18. The detected energy may be used to infer certain properties of the subsurface rock, such as structure, mineral composition, and fluid content, thereby providing information useful in the recovery of hydrocarbons. In the illustrated embodiment, the streamer 6 further includes position control devices 10 for positioning the streamer 6 in the water. The position control devices 10 may be any number of devices suitable for positioning the streamer 35 in the horizontal plane, the vertical plane, and/or both the horizontal and vertical planes, including "birds" having variable-incidence wings.

In accordance with some embodiments, a geophysical data product indicative of certain properties of the one or more formations 20 may be produced from the detected energy. The geophysical data product may include acquired and/or processed geophysical data (e.g., seismic data, electromagnetic data) and may be stored on a non-transitory, tangible, computer-readable medium. The computer-readable medium may include any computer-readable medium that is tangible and non-transitory, including, but not limited to, volatile memory, such as random access memory (RAM) and non-volatile memory, such as read-only memory (ROM), flash memory, hard disc drives, optical disks, floppy discs, and magnetic tapes. In some embodiments, the detected acoustic energy may be processed to generate a seismic image that may be stored on a non-transitory, tangible, computer-readable medium to form the geophysical data product. The geophysical data product may be produced offshore (e.g., by on a vessel) or onshore (e.g., at a facility on land) either within the United States and/or in another country. Specifically, embodiments may include producing a geophysical data product from at least the measured acoustic energy and storing the geophysical data product on a non-transitory tangible computer-readable medium suitable for importing onshore. If the geophysical data product is produced offshore and/or in another country, it may be imported onshore to a facility in, for example, the United States or another country. Once onshore in, for example, the United States (or another country), further processing and/or geophysical analysis may be performed on the geophysical data product.

FIGS. 2-4 illustrate examples of geophysical equipment that may be treated with the medetomidine compound. FIG. 2 illustrates a particular embodiment having an outer layer 22 comprising the medetomidine compound disposed on the streamer skin 24 of the streamer 6. FIG. 3 illustrates a particular embodiment having an outer layer 22 comprising the medetomidine compound disposed on position control devices 10. FIG. 4 illustrates a particular embodiment having the medetomidine compound integrated into the streamer skin 24.

FIG. 2 illustrates a portion of streamer 6 in accordance with a particular embodiment. As illustrated, the streamer 6 may include geophysical equipment, such as position control devices 10. positioned on the streamer 6 at selected positions. Streamers, such as streamer 6, are typically made of multiple components, such as strength members, conductors (e.g., electrical, optical, etc.), and spacers (none shown) covered with a protective streamer skin 24 enclosing the internal components of the streamer 6. In some embodiments, the streamer skin 24 may be treated with the medetomidine compound. As illustrated, an outer layer 22 comprising a medetomidine compound may be disposed on the streamer skin 24. The outer layer 22 may comprise a carrier material (e.g., polyurethane; wax; etc.) and the medetomidine compound. As previously described, the medetomidine compound may protect the streamer skin 24, for example, by inhibition of marine growth. The previously described techniques may be used for application of the outer layer 22. For example, the outer layer 22 may be coated on the streamer skin 24. In some embodiments, the outer layer 22 may be coated on the streamer skin 24 (or other suitable geophysical equipment) on the survey vessel 12 (e.g., shown on FIG. 1), for example, while the streamer skin 24 is being deployed into the body of water 16 (e.g., shown on FIG. 1). By way of further example, the outer layer 22 may be co-extruded with the streamer skin 24.

FIG. 3 illustrates a portion of streamer 6 in accordance with another embodiment. As illustrated, the streamer 6 may include geophysical equipment (e.g., position control devices 10), positioned on the streamer 6 at selected positions. In some embodiments, the position control devices may be treated with the medetomidine compound. As illustrated, the position control devices 10 may include wings 26 treated with the medetomidine compound. In the illustrated embodiment, the outer layer 22 comprising a medetomidine compound may be disposed on the position control devices 10, for example, on the wings 26. The outer layer 22 may comprise a carrier material (e.g., polyurethane, wax, etc.) and the medetomidine compound. As previously, described, the medetomidine compound may protect the position control devices 10, for example, by inhibition of marine growth. The previously described techniques may be used for application of the outer layer 22. For example, the outer layer 22 may be coated on the position control devices 10.

FIG. 4 illustrates an example of a streamer skin 24 of streamer 6 treated with a medetomidine compound. The streamer skin 24 may be elongated in that it may be longer than it is wide. The streamer skin 24 may have an inner surface 28 and an outer surface 30. The streamer skin 24 may also form an internal cavity 32 in which internal components of the sensor streamer may be disposed. The streamer skin 24 may formed of any suitable material, for example, that may serve to protect internal components from water intrusion. In some embodiments, the outer layer 22 should be acoustically transparent. Suitable materials for the streamer skin 24 may include, but are not limited to, thermoplastics, such as polyurethane, polypropylene, or polyamides. The streamer skin 24 may have any suitable dimensions. For example, the streamer skin 24 may have an outer diameter of about 40 millimeters to about 200 millimeters, about 50 millimeters to about 100 millimeters, or about 50 millimeters to about 75 millimeters. By way of further example, the streamer skin 24 may have a thickness of about 1 millimeter to about 10 millimeters, about 2 millimeters to about 5 millimeters, or about 3 millimeters to about 4 millimeters. It should be understood that these ranges for the outer diameter and thickness for the streamer skin 24 are merely exemplary and that embodiments may include a streamer skin 24 with an outer diameter and/or thickness.

In some embodiments, the streamer skin 24 may be treated with a medetomidine compound. For example, the medetomidine compound may integrated with the medetomidine compound. As previously described, particular embodiments may include combining the medetomidine compound with a base material for the streamer skin 24. The mixture of the base material and the medetomidine compound then be formed into the streamer skin 24 using any suitable technique, for example, molding or extrusion.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless states otherwise. The above description is intended to cover such alternatives, modifications, and equivalents as would be apparent to a person skilled in the art having the benefit of this disclosure.

The scope of the present disclosure includes any feature of combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

What is claimed is:

1. A method comprising:
providing a mixture comprising a medetomidine compound, a vegetable oil, and a wax, wherein the mixture does not comprise polyurethane;
deploying a streamer into a body of water from a vessel, wherein the streamer comprises a streamer skin; and
applying the mixture onto the streamer skin to form a wax coating as an outer layer on the streamer skin by spray, dip, roller, or brush coating of the mixture onto the streamer skin, wherein the mixture is applied to the streamer skin aboard the vessel while the streamer is being deployed into the body of water.

2. The method of claim 1, wherein the medetomidine compound is present in the mixture in an amount of about 0.01% to about 1% based on a total weight of the mixture, and wherein the mixture does not comprise a thermoplastic polymer.

3. The method of claim 1, wherein the medetomidine compound comprises ±4-[(1-(2,3-dimethylphenyl)ethyl]-1H-imidazole.

4. The method of claim 1, wherein the wax is selected from the group consisting of an animal wax, a petroleum wax, a plant wax, a polyethylene wax, and combinations thereof.

5. The method of claim 1, wherein the wax comprises a lanolin wax.

6. The method of claim 1, wherein applying the mixture onto the streamer skin to form the wax coating on the streamer skin comprises spray coating of the mixture onto the streamer skin.

7. The method of claim 1, wherein applying the mixture onto the streamer skin to form the wax coating on the streamer skin comprises dip coating of the mixture onto the streamer skin.

8. The method of claim 1 wherein applying the mixture onto the streamer skin to form the wax coating on the streamer skin comprises roller coating or brush coating of the mixture onto the streamer skin.

9. The method of claim 1, wherein the wax does not comprise a polyethylene wax, and wherein the mixture comprises an alcohol.

10. The method of claim 1, wherein a melting point of the wax coating is within 10° C. of a water temperature of the body of water.

11. The method of claim 1, wherein the streamer comprises a wing, wherein applying the mixture further comprises applying the mixture to form a wax coating comprising the medetomidine compound as an outer layer on the wing.

12. The method of claim 1, further comprising towing the streamer in the body of water, wherein the streamer skin does not comprise polyurethane.

* * * * *